INVENTORS
M. M. JOHNSON
G. C. RAY
C. E. SMITH

United States Patent Office 3,081,257
Patented Mar. 12, 1963

3,081,257
PRODUCTION OF AROMATIC FEEDSTOCK FOR CARBON BLACK REACTORS
Marvin M. Johnson, Gardner C. Ray, and Clifford E. Smith, Bartlesville, Okla., assignors to Phillips Petroleum Company, a corporation of Delaware
Filed June 6, 1960, Ser. No. 34,078
10 Claims. (Cl. 208—133)

This invention relates to increasing the aromatic content of mixed hydrocarbons. In one aspect it relates to the preparation of a high aromatic content feedstock for conversion to high abrasion resistance carbon black.

In recent years, added attention has been given to the composition of the hydrocarbon feedstock to carbon black furnaces. In particular, an increase in the aromatics content of the hydrocarbon feed to the carbon black reactors has been striven for in order to give greater yields of high abrasion resistance carbon black. In the past, it has been the practice to prepare such feedstocks by solvent extraction of suitable hydrocarbon streams. However, in many cases, the costs of solvent extraction are prohibitive, or otherwise unjustified in a commercial operation.

An alternative method that has been employed is to pass a preheated hydrocarbon oil through a conversion zone maintained at high temperatures and superatmospheric pressure where it is exposed intimately to the action of an aeriform fluid containing up to 20 percent by volume oxygen, usually air. Under these conditions, cracking and oxidative dehydrogenation of the feedstock occurs, with the resulting product being both of lower molecular weight and lesser hydrogen content, but not necessarily of higher aromatics content.

In the process of this invention, a normally liquid hydrocarbon mixture, such as diesel oil or a light cycle oil, is preheated to or near the reaction temperature; then it undergoes contact with a preheated, oxygen-containing gas in the vapor phase for a carefully limited period of time. Rapid quenching of the resulting reaction products mixture by contacting it with water immediately follows. Separating the mixture into a gaseous, aqueous and oil phase as products of the process, and purification, are the remaining major steps before injection of the oil phase into the carbon black furnace. Thus, the aromatics content is significantly increased, while the decomposition of the cyclic compounds in the hydrocarbon stream is carefully controlled to avoid the excessive formation of undesired lighter hydrocarbons, during the course of enriching the aromatics content of a hydrocarbon feedstock to a carbon black furnace.

It is, therefore, an object of this invention to provide a process for increasing the aromatics content of a carbon black furnace feedstock.

Another object is to provide a process for preparing a high aromatic content hydrocarbon feedstock by controlled oxidation for increased feedtsock conversion to high abrasion resistance carbon black.

Still another object is to provide an improved reactor and feedstock recovery system for use in an aromatics enriching process for a hydrocarbon feedstock.

Further objects and advantages of this invention will become apparent to those skilled in the art from a study of the accompanying disclosure, appended claims and drawing.

A more comprehensive understanding of the invention can be obtained by referring to the following description and the drawing, in which.

Figures 1, 2, 3:
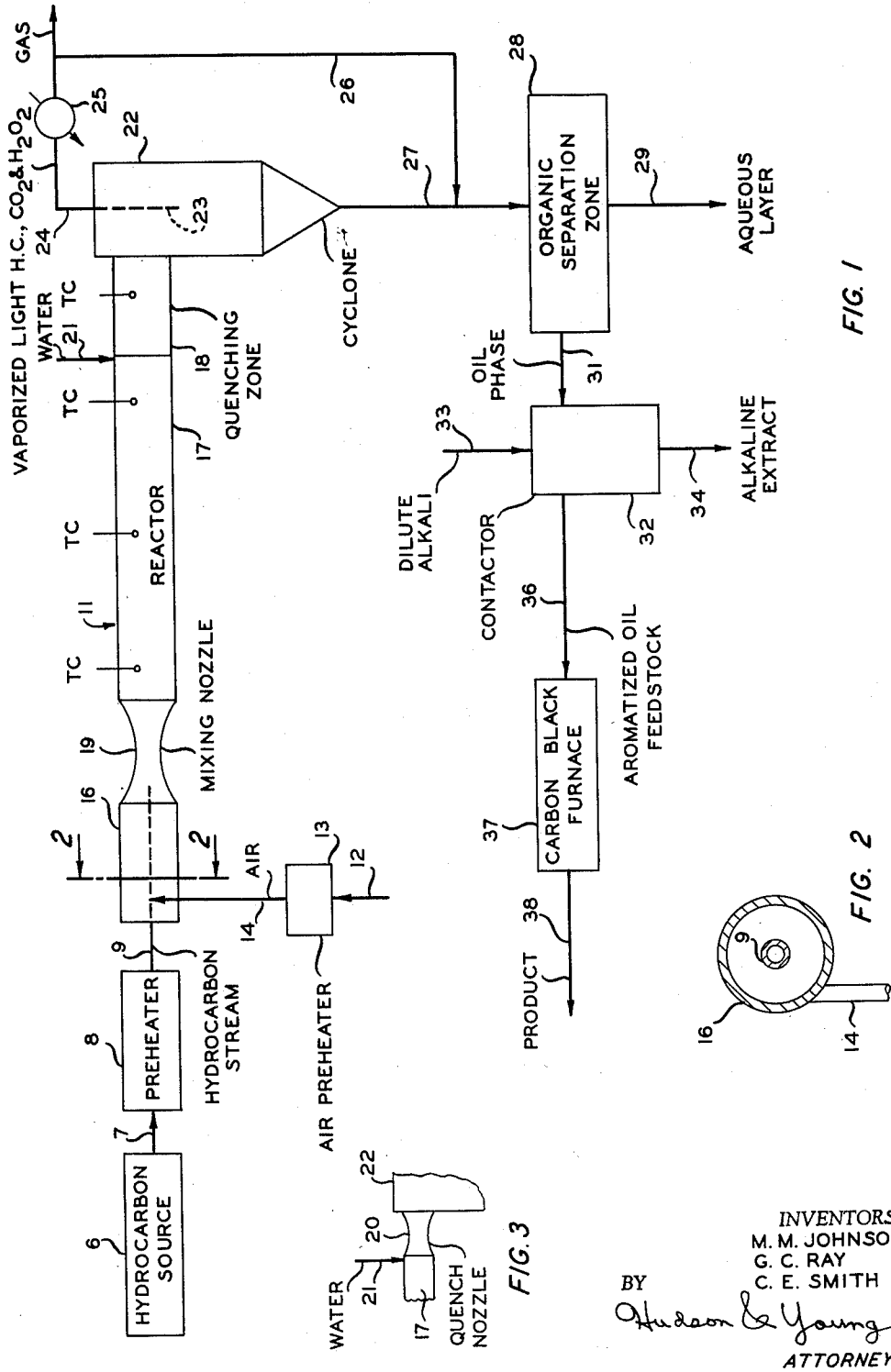
FIGURE 1 is a schematic representation illustrating a preferred embodiment of the invention.
FIGURE 2 is an elevational view, in full section taken along line 2—2 of FIGURE 1.
FIGURE 3 is a partial schematic representation illustrating a modification of that shown in FIGURE 1.

The present invention resides in an improved process for increasing the aromatic content of a hydrocarbon feedstock. In one embodiment, in a process in which a hydrocarbon feedstock comprising a mixture of paraffins, naphthenes, aromatics, and an oxygen-containing gas contact one another in a reaction zone under conditions of temperature and pressure suitable for producing reaction products of a higher aromatic content than the feedstock, the invention resides in the improvement which comprises passing said preheated reactants to a mixing zone and then flowing the reactants through a constricted section formed in an intermediate portion thereof, maintaining the ratio of pressure in the upstream end of said mixing zone to the pressure in the downstream end of said mixing zone at a value such that said reactants attain sonic velocity in said constricted section of said mixing zone, passing said mixed reactants through a reaction zone for a carefully controlled period of time at a temperature and pressure suitable for producing reaction products containing higher aromatics content than said reactants, introducing a cooling or quenching medium, such as water, into the reaction products in a sufficient quantity to form a liquid phase, said cooled reaction products passing from said quenching zone into a separation zone and recovering from said separation zone a hydrocarbon feedstock product richer in aromatics than said hydrocarbon feedstock fed to the process of this invention.

In a second embodiment of this invention, a second constricted section is formed intermediate the ends of said quenching zone. The reaction products are passed therethrough while maintaining the ratio of pressure in the upstream end of said quenching zone to the pressure in the downstream end of said mixing zone at a value such that said reaction products and quenching medium attain sonic velocity in said second constricted section. The quenched reaction products then pass into the separation zone, wherefrom a hydrocarbon feedstock product richer in aromatics than said hydrocarbon feedstock fed to the process of this invention is recovered.

In the process of this invention a hydrocarbon feedstock or fuel is employed which preferably has an initial boiling point above about 350° F. and an aromatic content above about 25 percent and generally between 25 and 60 percent. The aromatic content is determined according to ASTM Procedure D1319–58T. Suitable feedstocks include hydrocarbon streams resulting from catalytic cracking. Light cycle oils from these processes and various diesel fuels are applicable. The feedstocks are commonly liquids, but can be normally solid at temperatures at least as high as 100° F. since the stream is preheated to temperatures above 100° F. Generally, the preheating is to or near the reaction temperature, suitable reaction temperatures being in the range of 800 to 2000° F.

The process of the present invention involves, among other reactions, the reaction of hydroaromatic hydrocarbons with oxygen. A partial oxidative dehydrogenation reaction occurs which can be illustrated by the conversion of 1,2,3,4-tetrahydronaphthalene, naturally occurring in hydrocarbon streams, to the aromatic naphthalene, as shown by the following equation:

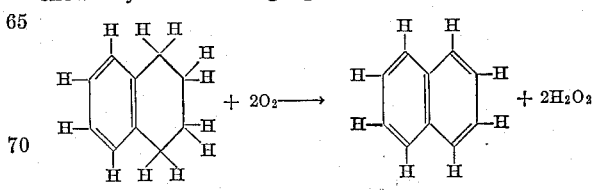

As seen from the foregoing equation, the reaction involves the removal of 1 hydrogen atom from each of the carbon atoms in the one saturated ring, and formation of a double bond between the carbon atoms, in the 1,2 position and in the 3,4 position. It is well known that tetralin, B.P. 207° F., can be dehydrogenated to naphthalene by heating at the boiling point in a stream of carbon dioxide. The formation and presence of carbon dioxide in the reaction zone apparently facilitates this conversion. Moreover, some dealkylation of aromatic compounds with alkyl side chains also occurs, forming side chain-free aromatics.

The aromatization of the hydrocarbon feedstocks is carried out with an oxidant such as oxygen or an oxygen-containing gas. It is usually preferred to employ air since the inert gases present in the air can be readily separated from the reaction products. However, pure oxygen can also be used, so long as the reaction time is carefully limited and satisfactory mixing of reactants is obtained so that the extent of cracking of the hydrocarbon feedstock is substantially minimized. It is also within the scope of the invention to employ pure oxygen diluted with other gases such as carbon dioxide and helium. Furthermore, combustion gases containing residual oxygen, preferably in amounts of 5 or more percent by volume, can be utilized.

The reaction of the hydrocarbon feedstock with the oxygen-containing gas occurs at a temperature in the approximate range of 800–2000° F. Since the reaction involved is exothermic, it is unnecessary to supply heat to the reaction zone except, if desired, during the start-up of the process. Prior to introduction into the reaction zone, reactant materials are preheated to a temperature sufficient to give the desired reaction temperature. It is to be understood that each of gaseous reactant materials can be heated to the same temperature or to different temperatures. In general, the reaction is effected at pressures above atmospheric pressure since the separation means connected downstream of the quenching zone is conveniently operated at about atmospheric pressure. Reaction pressures in the range of 1 to 150 p.s.i.g., more desirably between 5 and 100 p.s.i.g., are employed in the process of this invention. Since the reaction of this invention is carried out at temperatures above the critical temperatures of the reactants, the gas phase reaction can also be carried out at very high pressures, for example, up to about 100,000 p.s.i.g. The reaction rate is increased by raising the pressure in the reaction zone; so the actual pressure used will also be dependent upon the reaction rate which it is desired to obtain.

In order to avoid the dangers of forming explosive mixtures, it is usually preferred to utilize high weight ratios of hydrocarbon feedstocks to oxygen-containing gas. Thus, the weight ratio of the organic compound to oxygen is preferably at least 3.0. It is within the purview of the invention to employ a weight ratio of hydrocarbon feedstock to oxygen as high as 20.

The reaction times employed in the practice of the present invention are generally between 0.005 and 0.2 second. In accordance with the present process, the hydrocarbon feedstock and the oxygen-containing gas are introduced into the mixing zone and are rapidly mixed therein as they pass through a constricted section, such as a De Laval nozzle. Thereafter, the reactants flow through the reaction section for total time of about 5–200 milliseconds, at the reaction temperatures of 800–2000° F., before being contacted with a cooling or quenching medium. By controlling the length of the reaction zone, the throughput of feedstock and oxygen-containing gas, and the point at which the cooling medium is introduced, thus defining the downstream end of the reaction zone, it is possible to accurately control the reaction or residence time of the reactant materials in the reaction zone.

The critical feature of the invention is that the mixing nozzle provides rapid and adequate mixing of preheated reactants, thus enabling us to maintain very short and accurately controlled reaction times. This minimizes cracking, and together with the quenching feature of this invention allows us to increase the aromatic content substantially without cracking the feedstocks to hydrocarbons of boiling ranges too low for the most satisfactory results in carbon black manufacture.

In carrying out the present process, it is preferred to employ water as the cooling or quenching medium. Usually from 1 to 3 pounds of water per pound of the hydrocarbon feedstock is employed. However, if desired, greater amounts of water can be used in order to increase the rate of cooling and the dilution of the aqueous phase formed as a result of the water introduction. Water having a temperature in the range of 50–170° F. can be utilized, although in some cases it may be desirable to chill the water to its freezing point. Furthermore, it is within the scope of the invention to use aqueous solutions, such as aqueous NaOH, as the cooling or quenching medium. By the employment of a quenching medium as described, the reaction products mixture is rapidly quenched to a temperature below about 500° F., and preferably below about 250° F., so as to minimize undesirable side reactions and to condense liquefiable products. By the process of this invention, quenching is rapidly effected.

A preferred method of quenching is effected by injection of water just prior to or during passage through the throat of a converging-diverging nozzle, wherein the reaction products attain sonic velocity within the throat section. Downstream of the throat section, the velocity is supersonic and a shock front is created. Sufficient water is injected to always form a liquid phase in the separation zone. The mixture is thus rapidly cooled. Reaction mixture temperatures after quenching in the range of 100–500° F. are readily attained. Downstream of the shock front, the water is removed in a separation zone. This separation zone is suitably a liquid cyclone. The underflow from the cyclone comprises an aqueous phase and an oil phase which readily separate. The oil phase can be recovered by decantation and charged to the carbon black reactors. The recovered aqueous phase can be treated to recover hydrogen peroxide. If desired, the oil phase can be additionally treated prior to use to recover phenolic compounds by washing with a dilute alkali, such as sodium hydroxide. Phenolic compounds are extracted and recovered from the alkaline aqueous phase by acidifying with sulfuric acid whereupon an oily phenolic oil separates.

Referring now to the drawing, and to FIGURE 1 in particular, a suitable hydrocarbon feedstock, such as a light gas oil, is fed from a hydrocarbon source 6, such as a catalytic cracking unit, through conduit 7 to a preheater 8, wherein the feedstock is heated to a temperature near or within the desired reaction temperature range of 800–2000° F. The preheated oil leaves preheater 8, via line 9, and is fed, preferably axially, to the entrance of a reactor generally designated 11. Oxygen or oxygen-containing gas is metered through separate conduit 12 to preheater 13 and passes therefrom through line 14 to the entrance of reactor 11 where it is introduced, preferably tangentially. The reactor 11 comprises a mixing section 16, a reaction zone 17, and a quenching section 18. The air and hydrocarbon feedstock are rapidly mixed in mixing zone 16, as they pass through mixing nozzle 19 thereof, at sonic velocity. The thoroughly mixed reactants pass through reaction zone 17 for varying residence times, as may be determined by their throughput rates and the length of reaction zone. Immediately downstream of reaction zone 17 and at the upstream end of quenching zone 18, water is admitted through line 21. The temperature of the reaction mixture is rapidly dropped as a result of the expansion created downstream of the nozzle.

In the second embodiment, illustrated in FIGURE 3, the reaction products mixture passes through the throat of a quenching nozzle 20 disposed in quench zone 18, at sonic velocity, which will cool the reaction products even more rapidly and efficiently than in the first embodiment. Reaction mixture which is now at a temperature generally below the boiling point of water is passed directly to adjacent cyclone 22, so as to effect separation of the liquid and gaseous reaction products. The gas phase passes through overflow tube 23 within the cyclone to exit line 24, thence through cooling means 25 and is recovered for separation of the lighter hydrocarbons, if desired. The entrained liquid in the gas is passed via conduit 26 to cyclone underflow line 27. The underflow stream from cyclone 22 comprises an aqueous phase and an oil phase which pass through line 27 to organic separation zone 28. In organic separation zone 28 the phases separate rapidly and the aqueous layer is withdrawn through line 29. The oil phase is removed via line 31 and is passed to contactor 32, wherein the oil phase can be further treated, if desired, for removal of valuable products.

A dilute aqueous solution of an alkali metal hydroxide can be admitted through line 33 to contactor 32, and is contacted with the oil phase therein. The resulting alkaline aqueous extract is recovered through line 34. This alkaline extract can be further treated with sulfuric acid in another suitable contactor (not shown) so as to separate phenolic compounds as side products of this process. The aromatized oil is removed from contactor 32 via line 36 and is now a suitable feedstock for the production of high abrasion resistance carbon black in furnace 37, by incomplete combustion. The carbon black furnace effluent is removed from furnace 37 via line 38 to product recovery.

The attainment of sonic velocities in the throat section of nozzles 19 and 20 is important in order to obtain accurate control of the process reaction time and to effect the desired mixing of the reactants and cooling of the reaction products. The conditions necessary for obtaining sonic velocity can be obtained by controlling the pressures in the reaction zone and in the downstream end of the diverging section of the nozzle 19. For a perfect gas mixture, sonic velocity in a nozzle throat is reached when the ratio of static pressure in the downstream zone ($P_c$) to the upstream pressure of the nozzle ($P_o$) equals or exceeds the value given in the following equation:

$$\frac{P_c}{P_o} \geq \left[\frac{2}{K+1}\right]\left[\frac{K}{K-1}\right]$$

In this formula, K is the ratio of the specific heat at constant pressure to the specific heat at constant volume. Since ideal conditions do not generally prevail, the foregoing formula gives only a close approximation. The attainment of sonic velocity can be positively indicated by measuring the mass rate of flow while increasing the value of $P_c$, the value of $P_o$ being held constant. When this is done and the velocity in the nozzle throat is less than sonic velocity, the mass rate of flow increases with each increase in the value of $P_c$ until sonic velocity is reached. Thereafter, an increase in $P_c$ has little, if any, effect upon the velocity of the reaction products in the nozzle throat. The sonic or acoustic velocity, $\alpha$, can be computed according to the following equation $$\alpha = (g_c KRT)^{1/2}$$

in which K is the ratio of specific heats as previously defined, $g_c$ is the force constant, R is the gas constant, and T is the temperature in the nozzle throat. The values of $P_c$ and $P_o$, as designated above, can be readily adjusted so as to obtain the desired sonic velocity and concomitantly the desired cooling of the reaction products. For a discussion of sonic velocities and their determination, reference may be had to "Principles of Jet Propulsion and Gas Turbines," M. J. Zucrow, pages 67–189, John Wiley and Sons, Inc., New York, New York (1948). This reference also describes De Laval type nozzles which can be advantageously employed in the practice of the present invention. However, it is to be understood that any suitable nozzle comprising a converging section, a throat section and a diverging section can be utilized in the practice of the process of this invention.

A more complete understanding of the invention can be obtained by referring to the following illustrative example, which is not intended, however, to be unduly limitative of the invention.

EXAMPLE I

For this run, the hydrocarbon fuel fed to the reactor was a diesel fuel having an API gravity of 34.5 at 60° F. and an ASTM 50 percent distillation point at 531° F. This feed was preheated to 780° F. and fed axially to a De Laval nozzle at the entrance to the reactor. This fuel was metered at a rate of 90 pounds an hour. The fuel was mixed with air which had been preheated to a temperature of 1120° F. and introduced tangentially at the upstream end of the De Laval nozzle. The rate of air fed was the same as the fuel rate, i.e. 90 pounds per hour. In the reaction zone the temperature remained essentialy constant at about 1000° F., while the pressure was at approximately 2 p.s.i.g.

The reactor comprised a 4-inch long, 2-inch I.D. stainless steel inlet leading to a 2-inch long by ½-inch throat De Laval nozzle and a 6-foot long 2-inch I.D. stainless steel reaction section which was mounted between the nozzle and the inlet to a cyclone separator. A quench water inlet was mounted approximately 2 inches upstream of the entrance to the cyclone.

The water quench was introduced into the reactor at its downstream end just upstream of the entrance to the cyclone separator. The injection of water at a rate of 120 pounds per hours reduced the temperature of the reactants to 400° F., as measured at the entrance to the cyclone. The temperature of the gas phase leaving the overflow tube of the cyclone was 220° F., and was subsequently further cooled by passing through a tube surrounded by ice water. Using the reactor volume (0.11 cubic ft.) and an approximate value of 3200 cubic ft. per hour of reactants for the throughput, the reaction time was calculated to be 120 milliseconds. The water phase from the underflow of the cyclone contained hydrogen peroxide and phenolic compounds. The hydrocarbon phase had an API gravity of 26.8 at 60° F. as compared with a gravity of 34.7 for the feedstock. The ASTM distillation curve for the recovered oil phase was nearly the same as for the feed, with the 50 percent midpoint at 540° F. The distillation data for the feed to the reactor and for the recovered oil phase are summarized below together with the values for the API gravity.

Table I

|  | Feed | Product |
|---|---|---|
| Gravity, API @ 60° F. | 34.7 | 26.8 |
| ASTM Distillation, F.: |  |  |
| IBP | 361 | 341 |
| 5% Evaporated | 421 | 439 |
| 10% Evaporated | 439 | 459 |
| 20% Evaporated | 469 | 487 |
| 30% Evaporated | 491 | 506 |
| 40% Evaporated | 511 | 521 |
| 50% Evaporated | 531 | 540 |
| 60% Evaporated | 547 | 553 |
| 70% Evaporated | 564 | 570 |
| 80% Evaporated | 582 | 588 |
| 90% Evaporated | 598 | 606 |
| 95% Evaporated | 609 | 624 |
| End Point | 630 | 624 |

From the distillation data and the gravities summarized in the table, the Bureau of Mines correlation index for the feed and effluent were computed to be 35 and 54, respectively. Thus, the aromatic content of the recovered oil was considerably higher than that of the feed.

The method of computation is described in the Bureau of Mines Technical Paper 610 by H. M. Smith. The calculation was made as follows for the feed and the product:

$$\text{Correlation index} = \frac{48640}{K} + 473.7G - 456.8$$

K = average boiling point in degrees Kelvin.
G = specific gravity at 60° F./60° F.

By treatment of the hydrocarbon product with about equal volumes of 10 percent aqueous sodium hydroxide, alkaline aqueous phase was obtained. This aqueous phase was acidified with sulfuric acid whereupon a yellow oily layer separated out. This oil phase comprised phenols and naphthols.

We claim:

1. In a process in which a liquid hydrocarbon feedstock comprising a mixture of paraffins, naphthenes, aromatics, and an oxygen-containing gas contact one another in a reaction zone under conditions of temperature and pressure suitable for producing reaction products containing a higher aromatic content hydrocarbon feedstock and various combustion products, the improvement which comprises passing said hydrocarbon feedstock through a first preheater where it is raised to between 800 and 2000° F., passing a free oxygen-containing gas through a second preheater where it is also raised to between 800 and 2000° F., introducing said preheated hydrocarbon feedstock and said oxygen-containing gas into a mixing zone having a constricted section formed in an intermediate portion thereof, maintaining the ratio of pressure in the upstream end of said mixing zone to the pressure in the downstream end of said mixing zone at a value such that said reactants attain sonic velocity in said constricted section of said mixing zone, passing said mixed reactants through a reaction zone maintained between 800 and 2000° F. for a contact time suitable for producing reaction products including a hydrocarbon feedstock product containing a higher aromatics content than in said reactants, introducing a cooling medium into said reaction products in a quenching zone adjacent the downstream end of said reaction zone in sufficient quantity to cause said reaction products to form a liquid phase, passing said cooled reaction products from said quenching zone into a separation zone, and withdrawing from said separation zone a hydrocarbon feedstock product richer in aromatics than said hydrocarbon feedstock fed to said process.

2. A process according to claim 1 in which the temperature of said reaction products withdrawn from the downstream end of said quenching zone is less than 500° F., and the pressure in said reaction zone is in the range of 35 to 1000 p.s.i.a.

3. A process according to claim 1 in which the contact time of said mixed reactants in said reaction zone ranges between 5 and 200 milliseconds.

4. A process according to claim 1 in which the hydrocarbon feedstock is a diesel fuel.

5. A process according to claim 1 in which the weight ratio of said hydrocarbon feedstock to said oxygen-containing gas ranges between 0.5 and 10.

6. A process according to claim 1 in which said cooling medium is introduced at rate ranging between 1 and 3 pounds per pound of hydrocarbon feedstock.

7. The combination of claim 1 in which the hydrocarbon is introduced axially into the converging entrance portion of said first constricted section.

8. The combination of claim 1 in which the free oxygen-containing gas is introduced substantially tangentially into the converging entrance portion of said first constricted section.

9. The combination of claim 1 in which the hydrocarbon is introduced axially into the converging entrance portion of said first constricted section and the free oxygen-containing gas is introduced substantially tangentially into the converging entrance portion of said first constricted section.

10. In a process in which a liquid hydrocarbon feedstock comprising a mixture of paraffins, naphthenes, aromatics, and an oxygen-containing gas contact one another in a reaction zone under conditions of temperature and pressure suitable for producing reaction products containing a higher aromatic content hydrocarbon feedstock and various combustion products, the improvement which comprises passing said hydrocarbon feedstock through a first preheater where it is raised to between 800 and 2000° F., passing a free oxygen-containing gas through a second preheater where it is also raised to between 800 to 2000° F., introducing said preheated hydrocarbon feedstock and said oxygen-containing gas into a mixing zone having a first constricted section formed in an intermediate portion thereof, maintaining the ratio of pressure in the upstream end of said mixing zone to the pressure in the downstream end of said mixing zone at a value such that said reactants attain sonic velocity in said first constricted section of said mixing zone, passing said mixed reactants through a reaction zone maintained between 800 and 2000° F., for a contact time suitable for producing reaction products including a hydrocarbon feedstock product containing a higher aromatics content than in said reactants, introducing a cooling medium into said reaction products in a quenching zone adjacent the downstream end of said reaction zone in sufficient quantity to cause said reaction products to form a liquid phase, said reaction products passing through a second constricted section formed intermediate the ends of said quenching zone, maintaining the ratio of pressure in the upstream end of said quenching zone to the pressure in the downstream end of said quenching zone at a value such that said reaction products and quenching medium attain sonic velocity in said second constricted section, passing said cooled reaction products from said quenching zone into a separation zone, and withdrawing from said separation zone a hydrocarbon feedstock product richer in aromatics than said hydrocarbon feedstock fed to said process.

References Cited in the file of this patent

UNITED STATES PATENTS

| | | |
|---|---|---|
| 2,516,134 | Molique | July 25, 1950 |
| 2,608,594 | Robinson | Aug. 26, 1952 |
| 2,692,292 | Robinson | Oct. 19, 1954 |
| 2,767,233 | Mullen et al. | Oct. 16, 1956 |
| 2,823,243 | Robinson | Feb. 11, 1958 |
| 2,908,733 | Sage | Oct. 13, 1959 |
| 2,934,496 | Urban | Apr. 26, 1960 |
| 3,018,309 | Krejci | Jan. 23, 1962 |